Dec. 8, 1931.        W. E. STARK         1,835,993
              CONTROL FOR FUEL BURNERS
           Filed Jan. 23, 1928    2 Sheets-Sheet 1
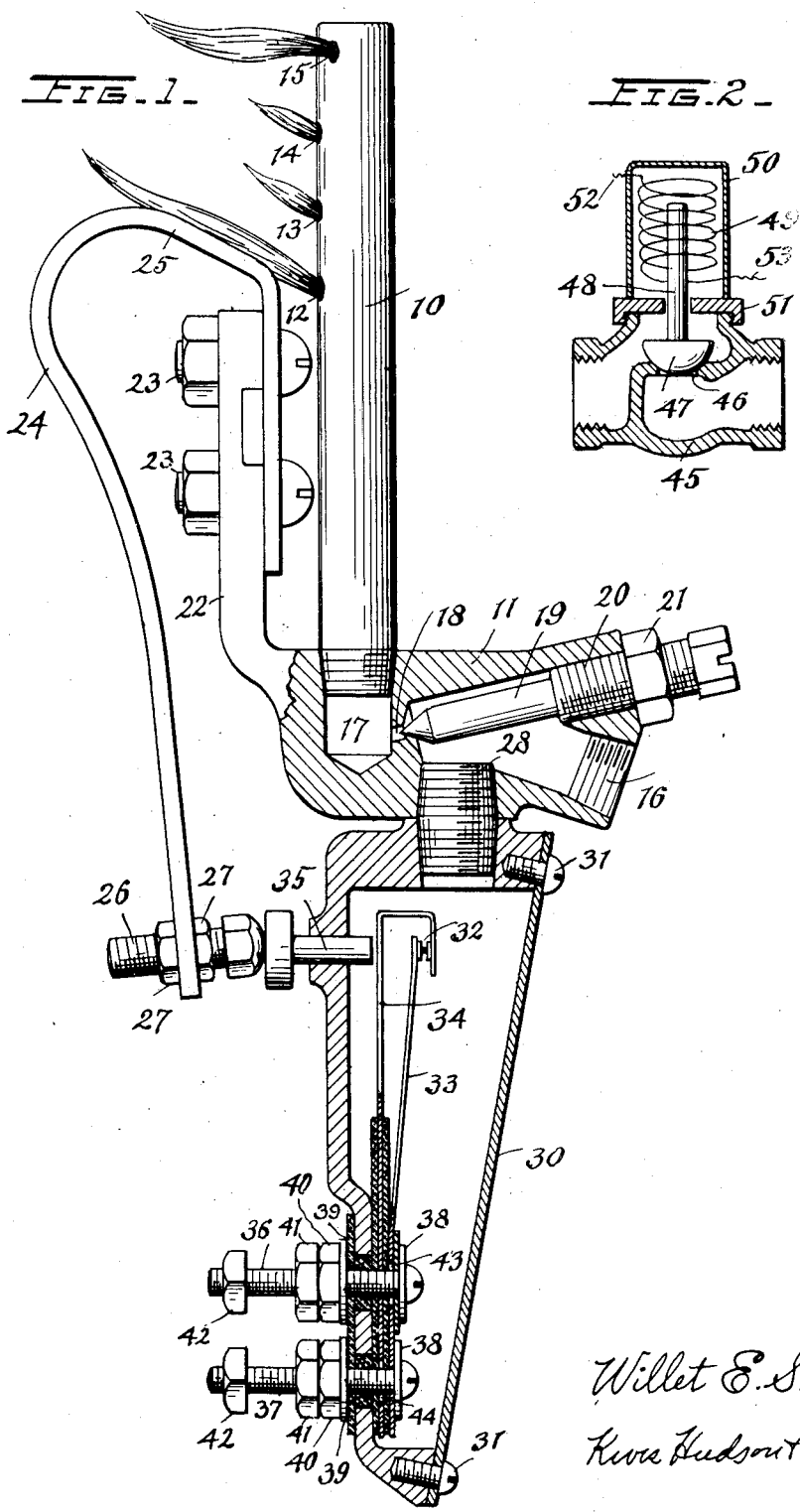
Inventor
Willet E. Stark
Kurr Hudson & Kent
Attorneys

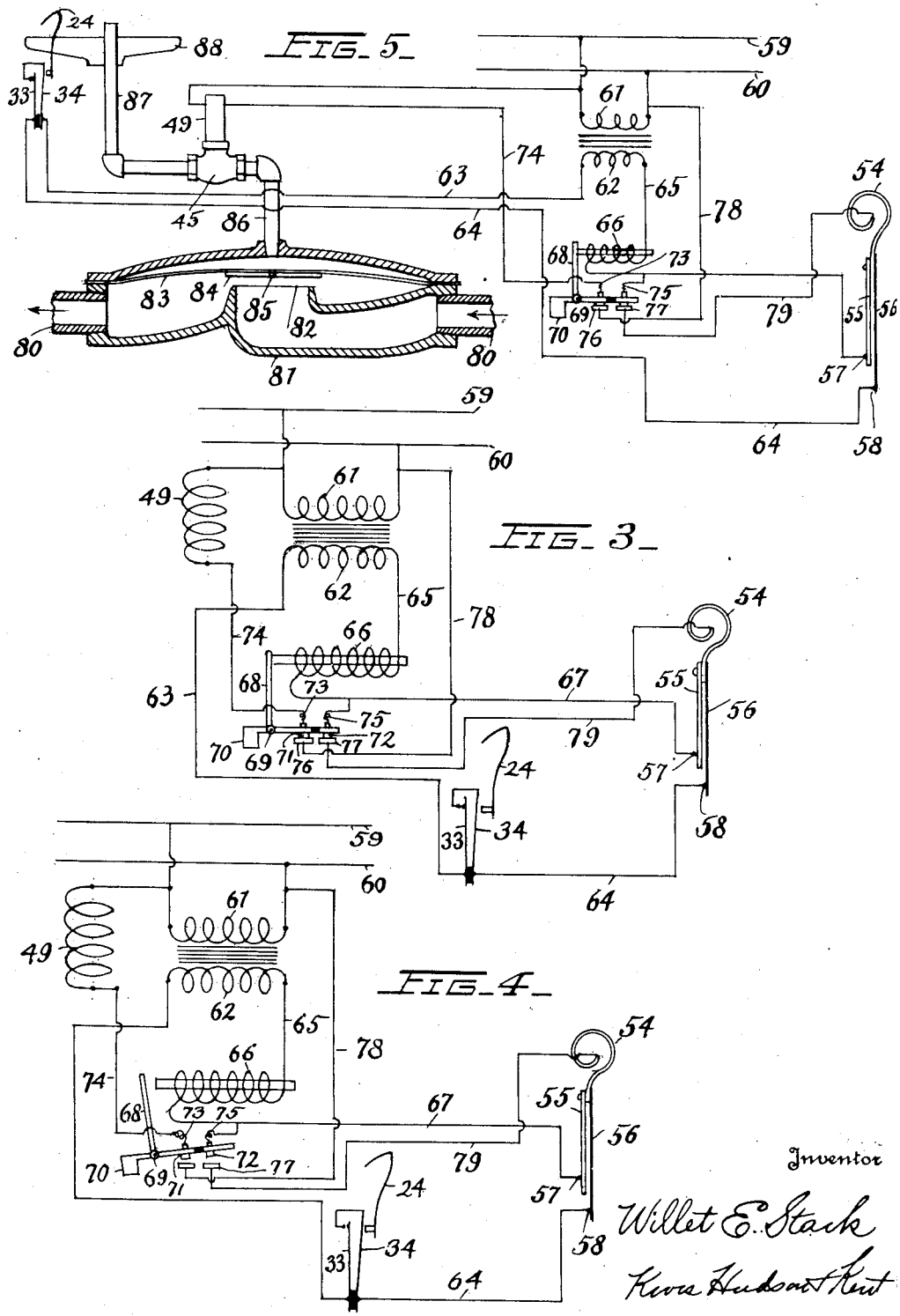

Patented Dec. 8, 1931

1,835,993

UNITED STATES PATENT OFFICE

WILLET E. STARK, OF EAST CLEVELAND, OHIO, ASSIGNOR TO THE BRYANT HEATER & MANUFACTURING COMPANY, OF CLEVELAND, OHIO, A CORPORATION OF OHIO

CONTROL FOR FUEL BURNERS

Application filed January 23, 1928. Serial No. 248,650.

This invention relates to improvements in controls for fuel burners, and has reference to thermostatic controls for fluid fuel burners, particularly thermostatically operated electric controls for gas burners.

In automatic heating systems employing gas as fuel, it is common practice to employ a pilot light or burner which should remain ignited at all times. When for any reason the pilot burner is extinguished, a considerable waste of gas may result before the condition is discovered, that is, after the room temperature descends to a point where the thermostatic control turns on the gas, and, furthermore, the extinguishment of the pilot presents a certain element of danger inasmuch as the furnace becomes filled with unburned gas, and if under such conditions an uninformed or careless person should attempt to light the burner an explosion will result. Accordingly, it is desirable to provide a means for automatically closing off the main gas supply whenever the pilot light is extinguished and for removing this obstacle to the flow of gas when the pilot is again lighted.

One of the objects of the present invention, accordingly, is the provision of simple and effective means for preventing the flow of gas to the main burner when the pilot is extinguished.

Another object is the provision of electrical means for accomplishing this result.

A further object is the provision of an electric control system for the main burner embodying an electric circuit which may be broken either by the action of a room thermostat or by the action of my improved pilot thermostat.

Still another object is the provision of an improved pilot unit in which a gas union carries the pilot burner, the bracket for the pilot thermostat, and the electric switch which is actuated by the pilot thermostat, the switch being supported in and protected by a casing which is readily separable from the gas union for servicing.

Another object is the provision of a looped metal thermostat and the mounting of the same so that a flame of the pilot will play directly upon the thermostat at or in the vicinity of the loop.

Other objects and objects relating to details of construction and economies of manufacture will appear as I proceed with the description of those embodiments of the invention which, for the purposes of the present application, I have illustrated in the accompanying drawings in which—

Fig. 1 is a side elevational view, partly in vertical section, of a pilot unit or sub-assembly which may be employed in carrying out the invention;

Fig. 2 is a sectional detail view, somewhat diagrammatic in character, of a gas valve which may also be employed in the invention;

Fig. 3 is a wiring diagram showing the electric control system with the parts in operative position, that is, with the main gas line open and the pilot lighted;

Fig. 4 is a similar diagram showing the parts in the position which they occupy when the main gas supply is interrupted by the pilot thermostat; and Fig. 5 is a diagrammatic view illustrating the application of the control system to a main gas valve of the diaphragm type.

Similar reference characters refer to like parts throughout the views.

In Fig. 1, a pilot burner to be employed in connection with a gas burner for a house heating furnace is illustrated at 10. It consists preferably of a pipe closed at its upper end and threaded at its lower end into a cast union 11. Near its upper end the pipe is provided with openings 12, 13, 14 and 15 through which the gas to be burned may flow. The flame fed by the opening 15 is comparatively large and is intended for the ignition of the gas from the adjacent main burner.

The opening 12 is also fairly large in order to provide a long flame for heating the thermostat, as will later appear. The intermediate openings 13 and 14 may be smaller as they are intended primarily for carrying the flame up or down, as the case may be, from one large flame to the other, depending upon where the igniting match is applied.

The union 11 is provided with a threaded opening 16 adapted to be connected to a gas supply pipe which is always open. Between the opening 16 and a second opening 17 below the burner 10, there is a restricted passage 18, the size of which may be regulated by a needle valve 19 threaded at 20 into the union 11 and locked in adjusted position by means of a lock nut 21.

The union 11 carries a bracket 22 which may be an integral part of the casting. This bracket preferably extends upwardly parallel to the burner 10 and is perforated to receive two bolts 23 by means of which a bar thermostat 24 is clamped to the bracket. This thermostat is rebent or looped as shown in the drawings, there being included in the loop preferably a short, straight portion 25 parallel with the direction of the flow of gas from the burner opening 12 and so positioned that the flame from this opening will play directly upon and through the length of the straight portion 25 of the thermostat, and thus produce the maximum heating effect. The lower end of the thermostat 24 may be perforated to take a round-headed bolt or pin 26 which is threaded for the reception of a pair of nuts 27 by means of which the pin may be adjusted with respect to the thermostat and held in adjusted position.

In an opening in the lower side of the union 11 there is threaded a plug 28 which is tapered toward both ends. The lower portion of this plug carries a casing consisting of a holder or supporting casting 29 and a cover plate 30 removably secured to the casting by means of screws 31. Obviously, the casing is removable by threading it off of the plug 28. This casing supports and protects an electric switch comprising a pair of contacts 32 mounted upon a spring finger 33 and a hooked spring 34 respectively. The construction is such that the contacts 32 tend to remain in engagement, but may be disengaged by the movement of the finger 34 to the right. Such movement may be accomplished by means of a headed pin 35 which is mounted to slide in an opening in the casting 29, and the head of which is so located as to be in line with the headed pin 26 on the thermostat 24. Movement of the pin 26 to the right, by reason of the cooling of the thermostat, pushes the pin 35 inwardly, shifting the switch finger 34 to the right and opening the switch.

The lower ends of the fingers 33 and 34 may be supported in the casting 29 and electrically connected with binding posts in any suitable manner. For this purpose I have shown two screw binding posts 36 and 37 insulated from the casting 29 and clamped thereto by means of washers 38, washers 39, and nuts 40, with lock nuts 41. Nuts 42 are provided for holding the wire terminals in place. The spring finger 33 is provided with a large opening 43 to clear the post 36 and has a small opening tightly fitting around the post 37 whereby electric connection is established with that post. The finger 34, on the other hand, has its large opening 44 surrounding and clearing the post 37 and is tightly fitted upon post 36 for electrical connection with the same.

In Fig. 2 I have shown a valve adapted to be mounted in the main fuel line of the gas heating furnace. The valve proper is of ordinary form comprising a casing 45 in which is formed a valve seat 46. A hemispherical valve piece 47 is mounted to engage the seat 46, the action of gravity upon the valve piece 47 being depended upon to maintain the valve closed. A soft iron valve stem 48 projects upwardly and constitutes the core of an electromagnet, the coil 49 of which is mounted within a casing 50 supported upon and attached to a collar 51 that is threaded to the valve casing 45. The terminals 52 and 53 of the coil 49 project through the casing 50, but the opening through which they extend are packed so that the casing 50 may be gas-tight. The details of this valve are of no importance so far as my invention is concerned and may be varied as desired.

Referring now to Figs. 3 and 4, wherein the arrangement of control apparatus for a house heating system is illustrated in two different operating conditions, Fig. 3 represents the condition where the pilot burner is ignited and the main gas valve is open, while Fig. 4 represents the condition where the pilot burner is out and the main gas supply cut off although the room thermostat is in position to open the gas supply. In these figures the room thermostat is represented at 54, being mounted at the inner end of the loop thereof. The outer end of the thermostat supports and is electrically connected to a relatively stiff arm 55 and a flexible arm 56 which are adapted to make electrical engagement with contacts 57 and 58 respectively.

Electric current for the system may be taken from line wires 59 and 60 to which are attached the terminals of the primary coil 61 of a step-down transformer. The secondary coil 62 of this transformer is connected at one end through a conductor 63 with switch finger 33 of the pilot thermostat switch. The other finger 34 of this switch is connected by a conductor 64 with the contact 58. The opposite end of coil 62 is connected by a conductor 65 with a magnet coil 66 and the latter by a conductor 67 with the contact 57.

The armature 68 of the magnet coil 66 is in the form of a bell crank pivotally supported at 69 and tending, by reason of a weight 70, to assume the position shown in Fig. 4. The horizontal portion of the armature 68 carries two contacts 71 and 72 which are insulated from each other. The contact 71 is connected through a flexible conductor 73 and a further conductor 74 with one end of the magnet coil 49 of the gas valve, the other end of this coil being connected with the line wire 59, as shown. The contact 72 on the armature 68 is connected by a flexible conductor 75 with the conductor 67.

In the attracted position of the armature 68, contacts 71 and 72 engage respectively with the terminals 76 and 77. Contact 76 is connected by means of conductor 78 with line wire 60, while contact 77 is connected by a conductor 79 with the fixed end of the room thermostat 54.

In Fig. 5 the electrical apparatus and connections are substantially identical with those of Figs. 3 and 4, but the arrangement of the magnetic gas valve in the system is different. Instead of employing the magnetic gas valve to control the fuel feed line directly, I here use it as an indirect means for accomplishing the same purpose. The parts of the valve and the current for operating it may be very much smaller than where the main flow of gas is directly controlled. Interposed between parts of the main gas supply line 80 is a large valve casing 81 having a circular valve seat 82 therein. The diaphragm 83 separates the casing into two parts and carries a valve plate 84 which is adapted to engage the seat 82 for closing the valve. Through the plate 84 there is a small bleed hole 85 through which gas flows into the chamber above the diaphragm. This upper chamber is connected as shown with a pressure relief conduit 86 which leads to an escapement 87 in the furnace adjacent to the main gas burner 88. The valve 45', corresponding to the valve 45 previously described, may be of relatively small size and is located in the relief conduit 86 for controlling the escape of gas from the upper part of the diaphragm valve and thus indirectly controlling the main or diaphragm valve, as will be explained presently.

*Operation.*—Assume that the main burner of the system is in operation. This means that coil 49 is energized by current flowing from line wire 59 through the coil 49, conductors 74, 73, contacts 71, 76, and conductor 78 back to line wire 60. The core 48 of the main gas valve is thus attracted and held in its upper position with the valve piece 47 off its valve seat 46. Now, assume that the temperature of the room in which the thermostat 54 is located rises above the critical temperature for which the thermostat is set to act. This condition will cause the thermostat 54 to expand or unwind. The first result of such action will be to cause the arm 55 to leave the terminal 57. Lead wire 67 to the magnet coil 66 will thus be cut out, but that coil still remains energized, owing to the circuit through conductor 75, contacts 72 and 77, conductor 79, thermostat 54, flexible arm 56, terminal 58, conductor 64, switch 34, 33, conductor 63, through secondary coil 62 of the transformer and conductor 65 back to the coil 66. A further slight rise in room temperature, however, causes flexible arm 56 to leave the terminal 58, whereupon the coil 66 is de-energized and the armature 68 swings upon its pivot 69 into the position shown in Fig. 4, breaking connection between the contacts 71, 76 and the contacts 72, 77 respectively. The circuit through coil 49 is thus broken and the valve piece 47 is permitted to drop by gravity onto the valve seat 46. The flow of gas to the main burner is thereby interrupted.

Now when the room temperature is again lowered a certain predetermined amount, as, for instance, 1° or 2° F., the thermostat 54 contracts or winds up. The flexible arm 56 first engages the terminal 58. Nothing happens when this takes place, however, because the return conductor 67 is not yet in the circuit and the return conductor 79 is broken at the contacts 72 and 77. As soon as further slight cooling brings the arm 55 into contact with the terminal 57, current again flows through magnet coil 66 from transformer coil 62 by way of conductor 65, coil 66, conductor 67, terminal 57, arm 55, arm 56, terminal 58, conductor 64, switch 34, 33 and conductor 63 back to the transformer. The coil 66, being thus energized, attracts armature 68 and closes contacts 71, 76 and 72, 77. The circuit through coil 49 previously described is again established and the valve 47 is consequently raised. Gas will then flow to the main burner and be ignited by the flame of the pilot burner 10, providing the latter is lighted. However, should the pilot burner 10 have gone out either at the time the main burner went out or subsequently, it would have interfered with the reestablishment of the gas flow in the main fuel line and the engagement of the arms 55 and 56 with the terminals 57 and 58 would not have served to again turn on the gas. This interference with the room thermostat control is brought about by the action of the pilot thermostat switch, as will now be explained.

So long as the gas discharged from the opening 12 in the pilot burner is ignited, the flame plays upon the thermostat 24 and expands or unwinds it so that its lower end is swung toward the left in Fig. 1, and no force is exerted to separate the contacts 32 of the pilot switch, but whenever the flame from opening 12 of the pilot burner goes out, the thermostatic metal cools and contracts, with the result that the lower end of the thermostat swings toward the right, pushing pin 35 inwardly against spring finger 34 and moving the latter away from finger 33. The conductors 63 and 64 are thereby disconnected. When the room thermostat operates to make contact at both of the terminals 57, 58, this would ordinarily complete the circuit through coils 62 and 66 and thereby swing armature 68 to complete the circuit through coil 49 and turn on the gas, as previously explained. However, the switch 33, 34 being located in an essential part of the circuit through the coil 66, and this switch being open due to the cooling of the pilot thermostat, the coil 66 cannot be energized, the gas cannot be turned on, and no waste of gas or danger of explosion can result. Gas flows through the pilot burner continuously whether the pilot is lighted or not, and, consequently, to put the system into working order again it is necessary only to again ignite the pilot burner, and this will be done as soon as the occupants of the building are apprised of the condition by the low temperature of the rooms. After the pilot is again ignited, the heating of the thermostat 24 proceeds rapidly, and it is a matter of a few moments only until the switch contacts 32 are again permitted to come together, whereupon the electric circuits are completed and the main gas valve 45 is opened.

In the case of the arrangement shown in Fig. 5, the general results are the same as with the system illustrated in Figs. 3 and 4, but the results are brought about in a slightly different manner. The diaphragm valve illustrated in Fig. 5 is one of the type that is well known in the art. It remains open so long as the escape of gas from the compartment above the diaphragm is not interfered with. When this escape is stopped, however, pressure upon the upper side of the diaphragm builds up and causes the diaphragm to descend so that the plate 84 carried thereby rests upon the seat 82 and stops the flow of gas. By locating the magnetic valve 45' in the relief conduit for the upper chamber of the diaphragm valve, I am enabled to stop the escape of gas from the upper chamber and thus to bring about the closing of the diaphragm valve. Thus the opening and closing of the valve 45' indirectly opens and closes valve 81, and the operation of the system is just the same as though the valve 45' acted directly.

While in the drawings and in the foregoing specification I have disclosed more or less in detail certain embodiments of the invention, such disclosure is intended to be illustrative only and is not to be construed as in any way limiting the scope of the invention. For instance, the union 11 is herein illustrated as consisting of a single casting, but in practice it may consist of a plurality of castings directly connected together, or of a plurality of parts connected together some or all of which may be formed otherwise than as castings, the term "union" in the broader aspect in which it is here employed being intended to cover a gas connection which serves also to support the pilot burner, the thermostat or the bracket therefor and the electric switch, or certain of those parts.

Having thus described my invention, I claim:

1. In a system of control for fluid fuel burners, a pilot burner adapted to be positioned in operative relation with the main fuel burner of the system, a pilot thermostat mounted in position to be affected by the flame of said pilot burner, a diaphragm valve for the fuel supply to said main burner, a pressure relief conduit connected with said valve on one side of the diaphragm thereof, an electromagnetically operable valve in said conduit, a circuit for the electromagnet of said valve including a source of current, and an electric switch in said circuit adapted to be actuated by the movements of said pilot thermostat, the cooling of the pilot thermostat being adapted to open said switch, de-energizing the electromagnet to close its valve, whereby pressure builds up on the aforesaid side of said diaphragm and closes said diaphragm valve.

2. In a system of control for fluid fuel burners, a diaphragm valve for the fuel supply to the main burner of the system, a pressure relief conduit connected with said valve on one side of the diaphragm thereof, a second valve in said pressure relief conduit, said second valve having a bias toward closed position, an electromagnet for opening said second valve, an electric circuit for said magnet including a source of current, and means for opening said circuit, whereby said second valve closes permitting pressure to build up in said diaphragm valve upon the side of the diaphragm connected with said conduit, thereby closing said diaphragm valve.

3. Apparatus for use in a control system for fluid fuel burners, comprising a union adapted to be connected into a continuously fed fuel line, a pilot burner mounted in said union, a bracket carried by said union, a thermostat mounted upon said bracket in proximity to the flame of said pilot burner, a casing removably carried by said union, an electric switch enclosed by said casing, said thermostat being outside of said casing, and means extending through a wall of the casing for opening and closing said switch, the movements of said last named means being controlled by the movements of the thermostat when heated or cooled.

4. In combination, a pilot burner for fluid fuel adapted to be positioned in operative relation with a main fuel burner, a strip metal thermostat mounted at one side of said pilot burner and having a straight portion and a curved portion adjacent thereto extending back beyond the mounting thereof and away from said pilot burner, said pilot burner and thermostat being so arranged relatively to each other that a flame from said burner extends parallel with said straight portion and plays thereupon, and means adapted to interrupt the flow of fuel to said main burner upon the cooling of the thermostat.

5. Apparatus for use in a control system for fluid fuel burners, comprising a union adapted to be connected into a continuously fed fuel line, a pilot burner mounted in said union, a bracket carried by said union, a thermostat mounted upon said bracket in proximity to the flame of said pilot burner, a switch casing removably carried by said union independently of said bracket, an electric switch in said casing, and means adapted to be actuated by the thermostat for opening and closing said switch.

In testimony whereof, I hereunto affix my signature.

WILLET E. STARK